United States Patent [19]
Fairchild

[11] 4,419,798
[45] Dec. 13, 1983

[54] AUTOMATIC FLEXIBLE TUBE CUTTER

[76] Inventor: Wayne K. Fairchild, 3620 W. Pendleton Ave., Santa Ana, Calif. 92704

[21] Appl. No.: 245,744

[22] Filed: Mar. 20, 1981

[51] Int. Cl.³ .......................... B23P 23/00; B26D 1/22

[52] U.S. Cl. ...................................... 29/33 T; 83/354; 83/519

[58] Field of Search ................ 29/33.7, 566.1; 83/354, 83/519, 482, 907, 370, 185, 188

[56] References Cited

U.S. PATENT DOCUMENTS 2,547,375 4/1951 Chernack .......................... 83/519 X
2,554,555 5/1951 Bissell et al. ...................... 83/354 X
2,946,250 7/1960 Bahr .................................. 83/519 X
3,777,607 12/1973 Schofield .............................. 83/482

*Primary Examiner*—William R. Briggs
*Attorney, Agent, or Firm*—Francis X. LoJacono

[57] ABSTRACT

An automatic-cutting apparatus arranged to selectively cut a given length of flexible tubing, or ducting, without interruption while the tubing is being produced in a continuous manner. The apparatus comprises a cutting member having a cutting blade, and a wire-cutting tool, both being activated by a combination of electrical and pneumatic elements operated in a sequential manner, to cause the blade to engage and cut the shell or skin wall of the tubing, a sensing arm being provided to subsequently cause the wire-cutting tool to be activated so as to cut the reinforcing wire of the flexible tubing as the tube is being continuously formed.

3 Claims, 7 Drawing Figures

AUTOMATIC FLEXIBLE TUBE CUTTER

BACKGROUND OF THE INVENTION

1. Field of the Invention

This invention relates generally to a flexible tube manufacturing apparatus adapted for continuously producing an indefinite length of flexible wire-reinforced ducting, and more particularly to an automatic cutter to selectively cut the tubing along its length while being continuously formed.

2. Description of the Prior Art

It is well known in the art that various problems and difficulties are encountered in providing suitable means for cutting flexible tubing, or ducting, particularly the type that is formed by a continuous ribbon or tape material of indefinite length and a flexible spiral spring-like wire which are both bonded together to form the tubing.

The strips of flexible material and spring are continuously wrapped around the rollers of the machine and are bonded together as they advance axially along the rollers, whereby a flexible ducting is produced in a continual manner.

As examples of these machines one may consider U.S. Pat. No. 3,778,327 issued to Wayne K. Fairchild, the inventor of the present device, or U.S. Pat. No. 4,012,272 issued to L. H. Tiner.

Until the present, ducts of this type have been made in lengths of between twenty to forty feet, or more. In order to mark off and cut these lengths of tubing, a machine must be stopped each time. For example, if a multiplicity of ducts are to be produced having lengths of five feet, the machine must be stopped to allow the ducting to be measured at five-foot intervals and individually cut. Thus, the machine must be shut down and each given length must be cut, after which the machine is restarted.

Often, additional problems occur when the machine is restarted, such as when strip and wire become out of phase, etc.

SUMMARY AND OBJECTS OF THE INVENTION

Accordingly, the present invention has for an important object to provide an automatic-cutting apparatus that is not only compatible with most present flexible tube-producing machines, but allows a machine to produce a continuous uninterrupted run of tubing, whereby each given selected length of tubing or ducting can be cut automatically while it is being produced, without having to stop the machine.

It is another object of the invention to provide a cutting apparatus of this type that is sequentially operated as a simple electrical and pneumatic device that cooperates to selectively cause the shell or skin wall to be circumferentially cut a full 360°. A sensing arm is arranged to cause the wire-cutting tool to cut the encapsulated spring wire as the 360° cut is completed, thereby separating the selected length of tubing from that being continuously formed.

It is still another object of the invention to provide an apparatus of this character that is easy to service and to maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
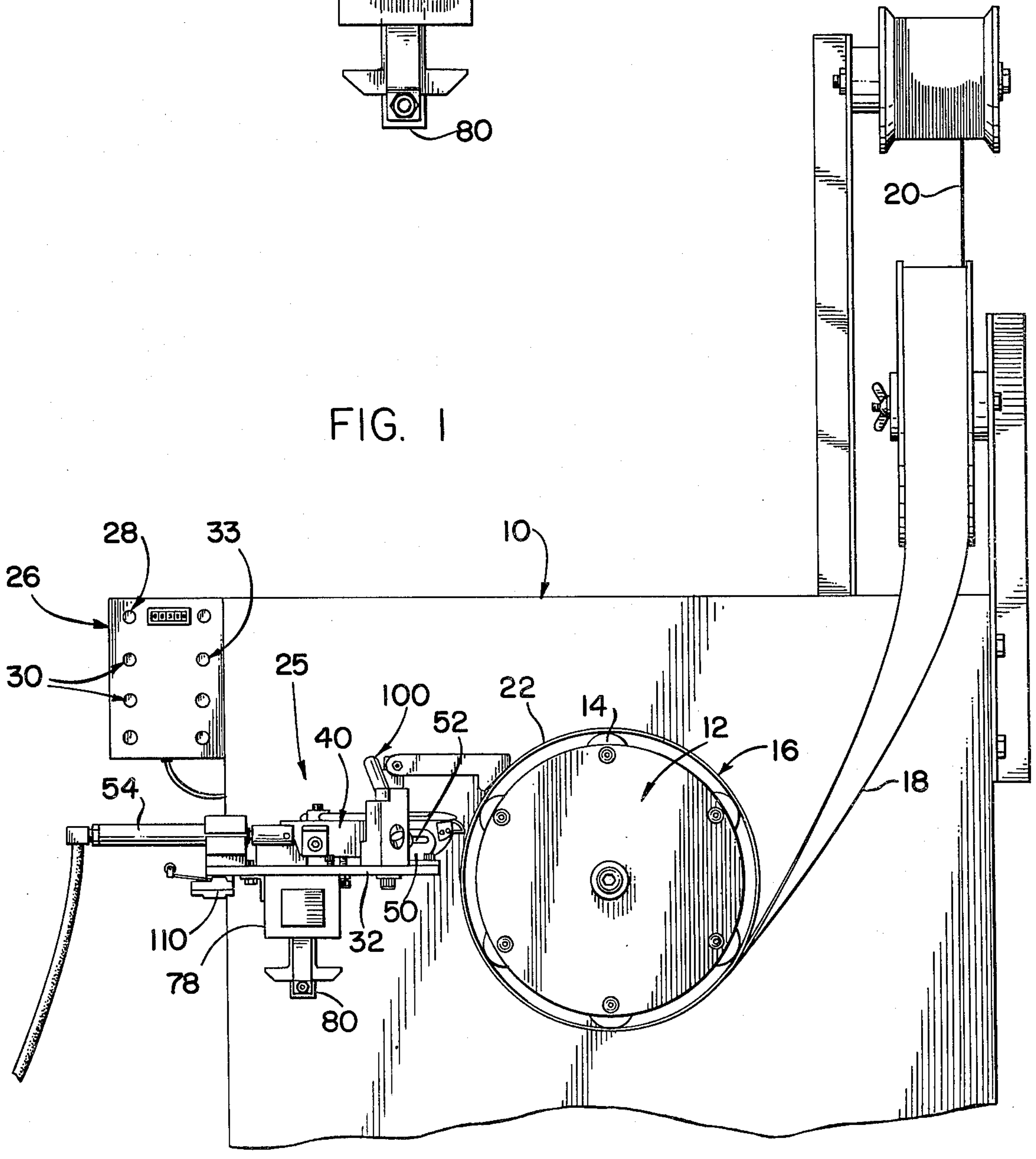
FIG. 1 is a partial view of a flexible-tube-producing machine, showing the wire and strip material being formed into a duct about a roller mandrel head, and wherein the cutting apparatus is positioned adjacent the free end of the mandrel head prior to cutting a length of tubing.

Referring more particularly to FIG. 1, there is shown a portion of a flexible-tube-manufacturing machine, generally indicated at 10, having a mandrel head 12 which includes a plurality of synchronously rotatable mandrel rollers 14. To form the flexible tubing 16, a ribbon 18 (formed generally from a flexible plastic or a metal foil) is employed along with a reinforcing element of metal wire 20. The reinforcing wire is fed about the mandrel rollers 14 in a sequential, progressive fashion, thereby forming a helically arranged wire structure. Thus, as the wire 20 is fed to the rollers, the longitudinal edge of the ribbon 18—which forms the body of the tubing 16 and further defines a tubular wall 22—is bonded in a suitable manner as it is circumferentially wrapped about wire 20 to completely enclose it, whereby the succeeding edge of the following ribbon wrap is bonded to the preceding ribbon wrap. Accordingly, by repeating this operation, a continuous flexible duct is produced. Various diameters of ducts can be readily formed by selecting and changing to different sizes of mandrel heads.

The present invention is provided to selectively cut a given length of duct as it is being formed, thus allowing for the continuous uninterrupted production of tubing without having to shut down the tube-forming machine for the cutting operation.

An automatic flexible tube cutter, generally indicated at 25, is shown in FIG. 1 as being mounted to machine 10 adjacent the forward end of mandrel head 12, whereby the tubular duct is allowed to be cut just as it becomes free from the mandrel head. The tube cutter 25 is adapted to be manually operated, but in its preferred form a control system is provided and is designated at 26. This control system has a selective counter-control means 28, which allows one to select a predetermined length of duct to be cut; and the control system also has a means 30 for controlling the speed between the action of cutter 25 and the speed at which the tubing is formed, so that a perfect separation of a given length of duct can be accomplished during the continuous forming of the tubing.

The automatic flexible tube cutter 25 comprises a mounting base 32 which is suitably mounted or attached to machine 10; and it also includes a movable tube-cutting means indicated at 34, a wire-cutting means indicated at 35, and a sensing means 36 adapted to be adjustable to cause the wire-cutting means to actuate at the proper time after the tube-cutting means has been activated. Both a pneumatic system and an electrical system for actuating various components are also included and will be hereinafter described with respect to the sequential operation of the apparatus.

Figure 4:
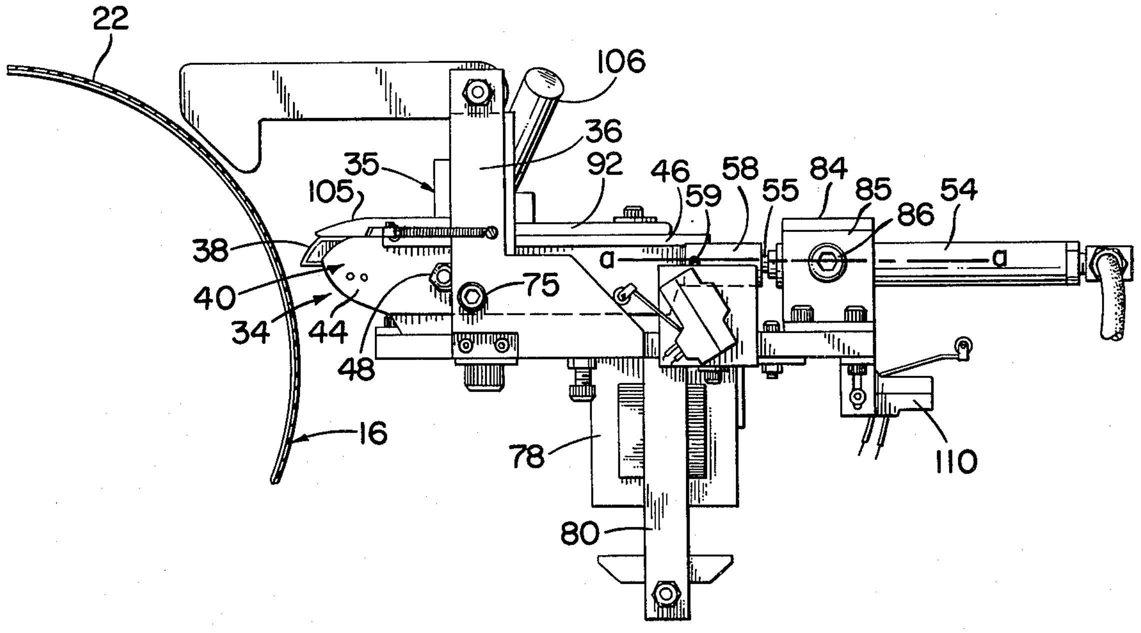
FIG. 4 is a side-elevational view of the opposite side from that seen in FIG. 2, showing the sensing arm adjusted to engage the duct wall.

The tube-cutting means 34 comprises a removable cutting blade 38 which is positioned adjacent the tube wall 22, as seen and illustrated in FIG. 1 and FIG. 4. A movable carriage 40 supports cutter blade 38 which is attached to the front of carriage 40 by a clamp 42. Carriage 40 is formed from an "L"-shaped bar having a vertical wall 44 and a horizontal wall 46. Thus, cutting blade 38 is clamped against vertical wall 44 and extends outwardly therefrom to engage tube wall 22 so as to cut through wall 22 as the wall rotates off the mandrel head 12.

The carriage 40 is slidably and pivotally mounted by pin 48 which is supported by bracket 50. Pin 48 is secured to carriage 40 and is received through slot 52 formed in bracket 50—whereby carriage 40 can slide longitudinally back and forth within slot 52, and in addition carriage 40 is pivotable within the slot because of the arrangement of pin 48.

Means to move carriage 40 and cutter blade 38 in a reciprocating action is provided by a pneumatic cylinder 54 which is interconnected to a suitable compressor-pump system (not shown), and is controlled by a switch means 33 within control system 26. Thus, when machine 10 is in operation, the various controls are set as mentioned to activate the cutting process, whereby the piston rod 55 of cylinder 54 is extended as shown in FIG. 5, the rod being pivotally connected to the extended leg member 56 of carriage 40 by connector member 58 and pivot pin 59.

When the process of forming the tubing is in progress, the cutter apparatus 25 is in an at-rest mode or position. That is, the carriage and cylinder are at least longitudinally aligned along axis a—a, and the pivot pin 59 must be aligned with or below centerline a—a. The reason for this is that, once cylinder 54 is activated under pressure, it remains under pressure until the wire-cutting sequence takes place.

Figure 5:
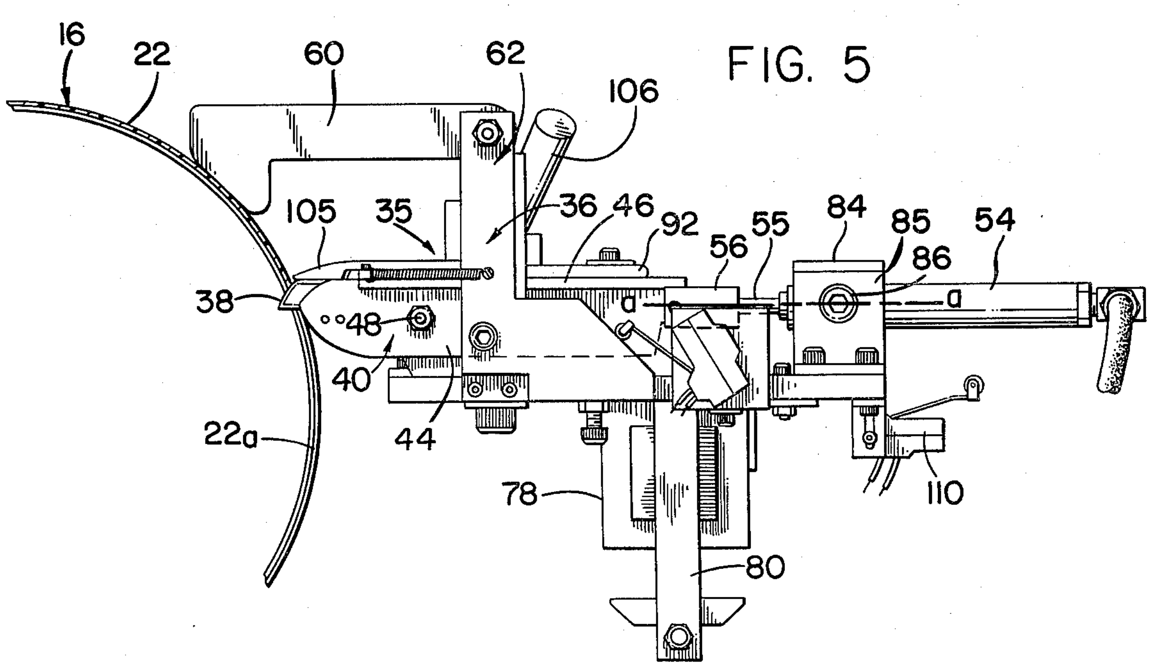
FIG. 5 is a similar side-elevational view, showing the cutting blade cutting through the duct wall.

Accordingly, when the timing means is set for a given cutting length of duct, the pressure from the compressor pump is released by an electrically controlled valve (not shown), causing piston 55 to move forwardly and forcing carriage 40 to move forwardly along axis a—a, and thereby causing blade 38 to puncture the skin or wall 22 of tubing 16 as illustrated in FIG. 5. The blade 38 cuts a continuous slash 22*a* in wall 22 as wall 22 rotates and moves off the head 12. (See FIG. 6.)

Figure 6:
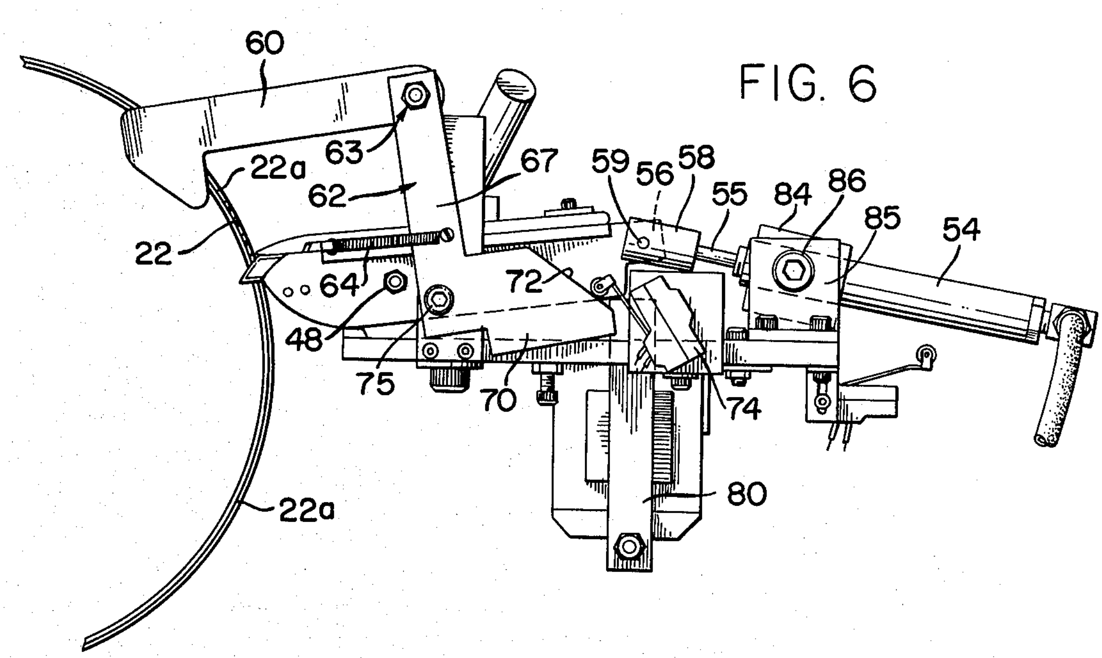
FIG. 6 is a further view showing the cutting blade moved forward and penetrating the duct wall, with the sensing arm passing through the annular cut.

The activated sensing means 36 will then sense when the 360° cut in wall 22 is completed, and then instantly cause wire cutter means 35 to be activated. Sensing means 36 comprises a sensing-arm member 60 which is normally positioned against wall 22 and arranged to drop into the annular slot 22*a* produced by blade 38, as illustrated in FIG. 6. Arm 60 is adjustably attached to a bell crank 62 by adjusting means 63, the crank being spring biased by spring 64 having one end attached to crank 62 and the opposite end attached to carriage 40 by member 65.

Adjusting means 63 can be any suitable device that allows arm 60 to be adjusted to the particular tubing size, and also allows the arm to be adjusted for the rotating speed of the tubing as it is being formed. The adjusting means herein shown comprises a threaded pin 66 secured to the upright strut 67 of crank 62 having sensing arm 60 secured thereon by nuts 68. The lower strut 60 of crank 62 includes an inclined cam surface 72 which is adapted to engage switch 74 as crank 62 pivots about a point defined by threaded pin 75 secured to a mounting bar 76 affixed to base 32. The pivoting of crank 62 in a forward manner occurs as sensing arm 60 passes through slot 22*a* in wall 22 by means of spring 64, creating a forward-pulling force as carriage 40 is extended forwardly. At this time cam surface 72 activates switch 74 which is electrically connected to operate solenoid 78. Solenoid 78 includes an actuating-bar member 80 which is forced upwardly through opening 82 formed in base 32. Actuating bar 80 is positioned under the connection between carriage 40 and cylinder 54, so as to engage carriage 40, and thus raising that end of the carriage to pivot about pin 48, as seen in FIG. 6. Hence, the connecting end of rod 55 is also raised as cylinder 54 is also pivotally mounted to base 32 by a pivot block 84 pivotally attached to a bracket 85 by pin 86, bracket 85 being secured directly to base 32.

Figure 7:
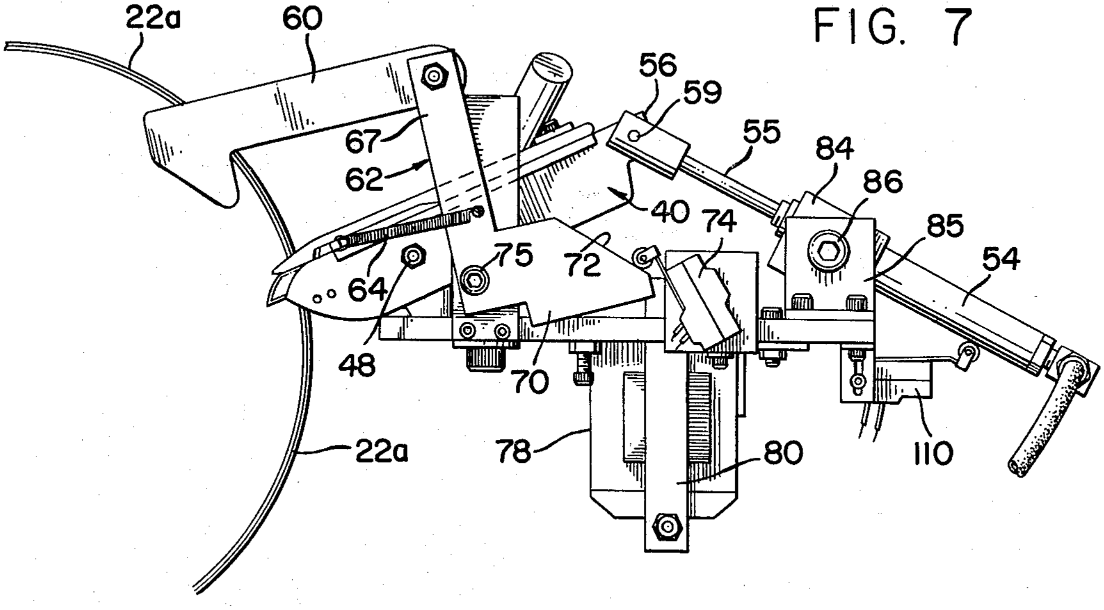
FIG. 7 is a side view of the present device in a fully extended position, this position causing the wire-cutting tool to cut the wire of the duct.

Since rod 55 is thus still under pressure, the forward thrust of rod 55 will cause both the carriage 40 and cylinder 54 to rise in a geniculating manner above the centerline a—a. That is, once the bending moment at the connecting point 58 is forced above centerline a—a, the force of rod 55 causes the carriage 40 to be raised to the extreme wire-cutting position illustrated in FIG. 7.

The wire-cutting means comprises a wire-cutting tool of any suitable type, the type shown herein being a wire cutter 90 having the typical scissor-like configuration that includes a first arm member 92 secured to the horizontal wall 46 by plate and screw 93 and 94, respectively, and by screws 95.

Figure 3:
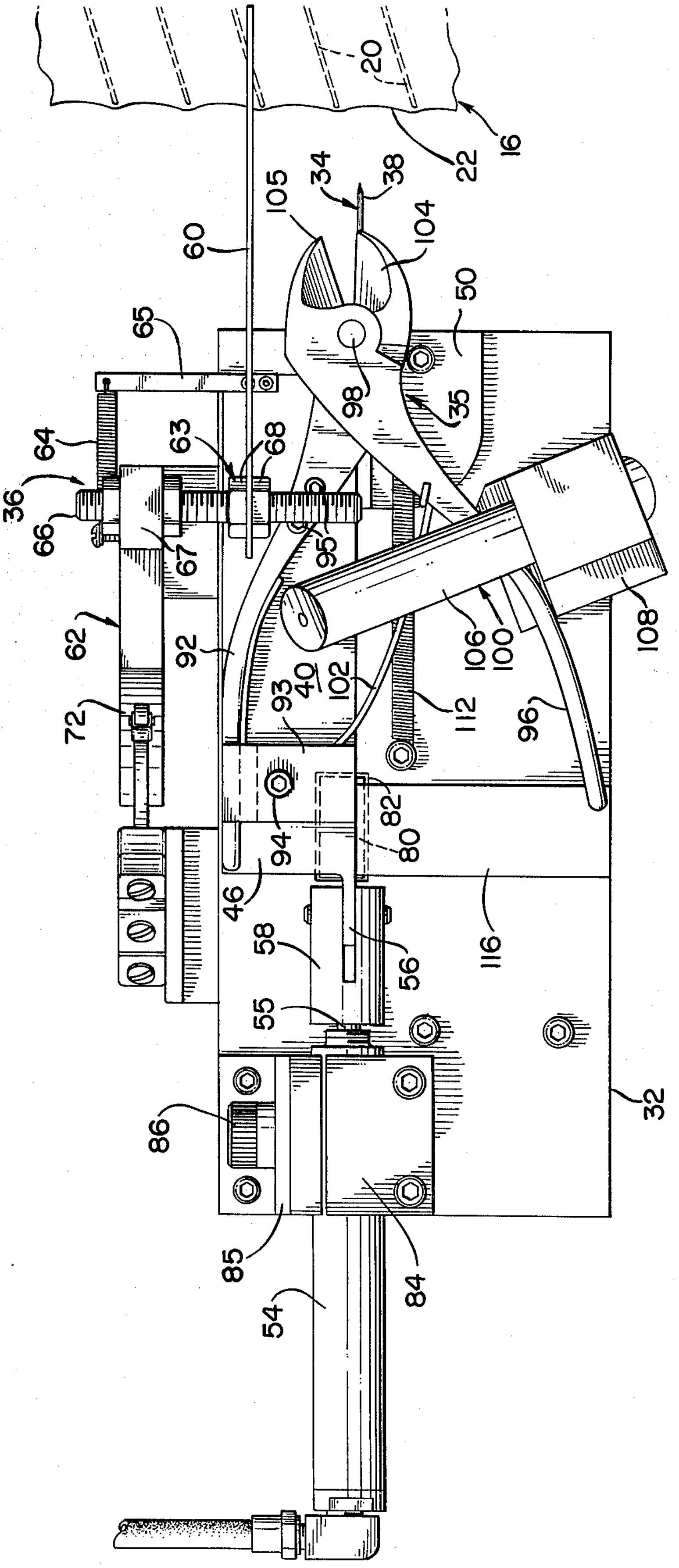
FIG. 3 is an enlarged top-plan view thereof, showing the position relationship between the cutting blade and the wire-cutting tool.

The second arm member 96 is typically pivoted at 98 and is freely actuated by cam means 100, arm 96 being spring-biased in a normal open mode by a suitable spring member 102, as seen in FIG. 3.

The respective arms 92 and 96 are formed having opposite jaw-like cutting heads 104 and 105, the cutting head 104 being generally positioned above blade 38 and substantially aligned therewith. Thus, as carriage 40 is raised as described, arm 96 will engage cam bar 106 which is adjustably supported in mounting block 108 fixedly attached to base 32. Arm 96 is forced inwardly against spring member 102, causing head 105 to close against fixed head 104, at which time wire 20 is positioned between the cutting heads and then severed.

Figure 2:
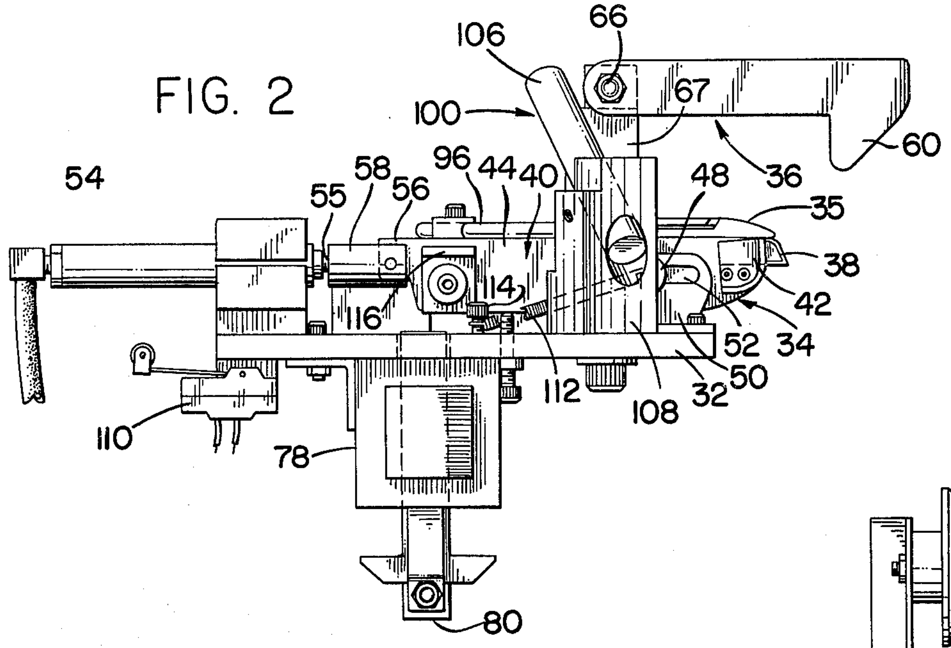
FIG. 2 is an enlarged side-elevational view of the cutting apparatus in a non-cutting retracted position.

The instant the moving wire is cut cylinder 54 engages switch 110, thus stopping the compressor pump and thus releasing rod 55 from its extended pressurized position. Once rod 55 is no longer under pressure, return spring 112 will return both carriage 40 and cylinder 54 back to their normally retracted position, as seen in FIG. 1, FIG. 2 and FIG. 3. Spring 112 is secured at one end to pin 48 and at the opposite end to base 32 by any suitable means, such as screw 114.

It should be noted that cutter arm 96 is free to engage cam bar 106; however, due to the upward thrust of arm 96, it must be provided with a support means which is defined by the laterally extended strut member 116 secured to carriage 40.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An automatic-cutting apparatus for selectively cutting a given length of wire-reinforced flexible tubing, comprising:
   - means for continuously forming a wire-reinforced flexible tubing;
   - a base member adapted to be secured to a fixed structure adjacent said flexible tubing, as said tubing is being continuously formed;
   - tube-cutting means operably mounted to said base member for selective cutting engagement with the annular wall of said tubing;
   - wire-cutting means operably mounted to said base member and adapted to cut the reinforcing wire of said tubing at a selected point, whereby said selected given length of said tubing is separated from the tubing being continuously formed;
   - means attached to said tube-cutting and said wire-cutting means for operating both of said means;
   - means for selectively controlling the predetermined length of tubing to be cut in a continuous manner;
   - a carriage member slidably and pivotally attached to said base member;

wherein said operating means comprises:
   - a first actuating means pivotally mounted to said base member and connected to said carriage member to slidably engage said cutting means with the annular wall of said tubing for establishing an annular cut in said wall;
   - a second actuating means mounted to said base member and adapted to pivotally move said carriage member, whereby said wire-cutting means engages and cuts said reinforcing wire of said tubing;
   - cam means adapted to be engaged by said wire-cutting means to cause said wire-cutting means to cut said reinforcing wire;
   - said tube-cutting means including a cutting blade mounted to said carriage; and
   - said wire-cutting means comprising a pair of opposed wire-cutting members pivotally attached to each other, one of said wire-cutting members being affixed to said carriage, and the other wire-cutting member being positioned to freely engage said cam means, in order to close said opposed wire-cutting members as said carriage member is actuated by said second actuating means.

2. An automatic-cutting apparatus as recited in claim 1, wherein said first actuating means comprises a pneumatic cylinder pivotally attached to said base member, said cylinder having a rod pivotally connected to said carriage member in order to cause said carriage to move longitudinally to engage said cutting blade with said annular wall, and to cause said carriage to pivot after said second actuating means engages said carriage when said carriage is in an extended tube-cutting position.

3. An automatic-cutting apparatus as recited in claim 2, including:
   - timing means to provide sequential operation of said tube-cutting means; and
   - means for selectively controlling the predetermined length of tubing to be cut in a continuous manner.

* * * * *